United States Patent

Schwartztrauber

[11] 3,939,591
[45] Feb. 24, 1976

[54] DECOY

[76] Inventor: George H. Schwartztrauber, 925 N. Ninth, West Des Moines, Iowa 50265

[22] Filed: Dec. 26, 1974

[21] Appl. No.: 536,545

Related U.S. Application Data

[63] Continuation-in-part of Ser. No. 414,918, Nov. 12, 1973, abandoned.

[52] U.S. Cl. .................................................. 43/3
[51] Int. Cl.² ...................................... A01M 31/06
[58] Field of Search ............ 43/3, 2, 42.09; 46/164, 46/173, 92

[56] References Cited
UNITED STATES PATENTS

| 364,573 | 6/1887 | Brinkop | 43/3 |
| 2,590,842 | 4/1952 | Colgan | 43/3 |
| 2,711,608 | 6/1955 | Fulster | 43/3 |
| 3,408,763 | 11/1968 | Rudolph | 43/3 |
| 3,478,459 | 11/1969 | Gazalski | 43/3 |
| 3,755,588 | 7/1956 | Johnson | 43/3 |

Primary Examiner—Warner H. Camp
Attorney, Agent, or Firm—Burd, Braddock & Bartz

[57] ABSTRACT

A fowl decoy having an inverted U-shaped body with open front and rear ends. A head is releasably connected to the top of the front of the body with a projection located in an opening. A downwardly directed leg is releasably connected to the midsection of the body to support the body in a field. The body has a second opening accommodating the upper end of the leg. Flotation means attached to the sides of the body enables the decoy to be used on water.

26 Claims, 16 Drawing Figures

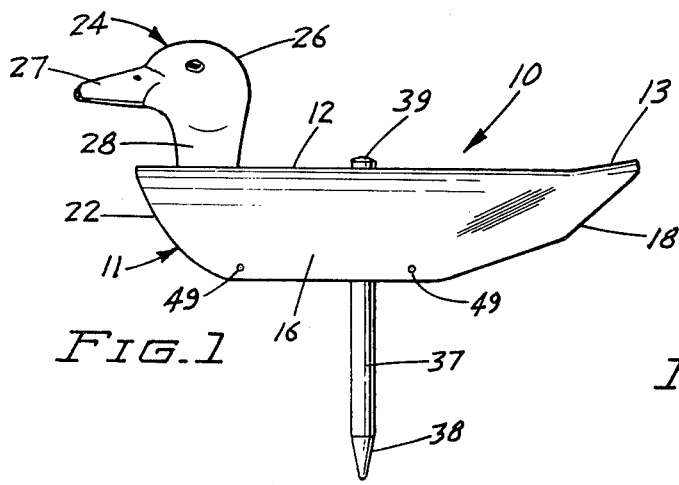
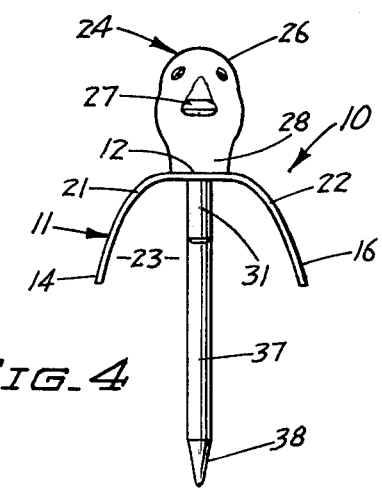
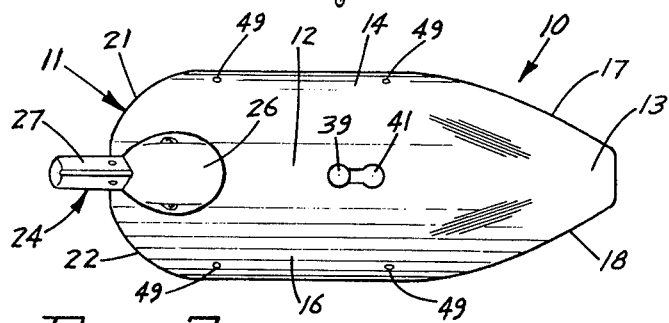
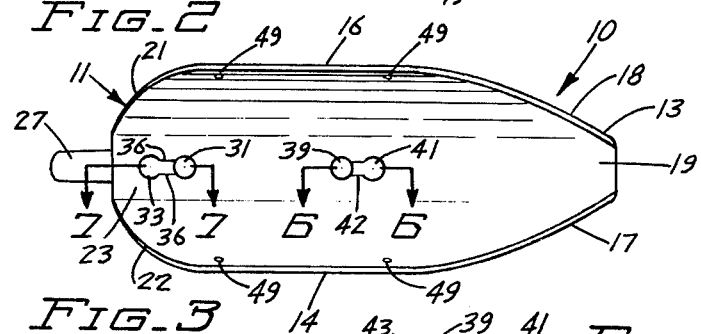
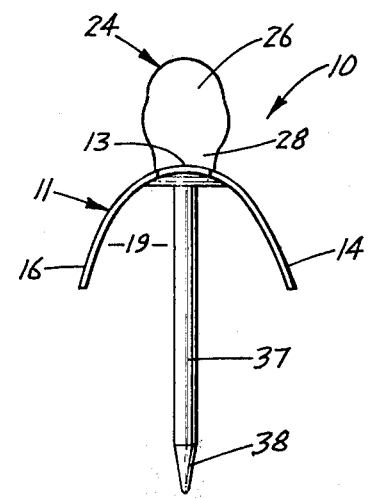
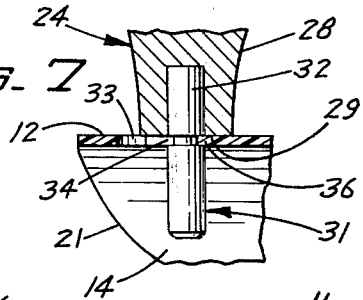
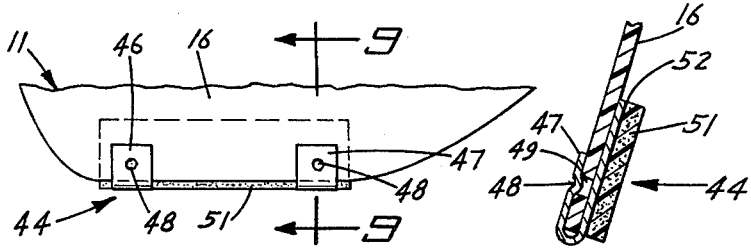
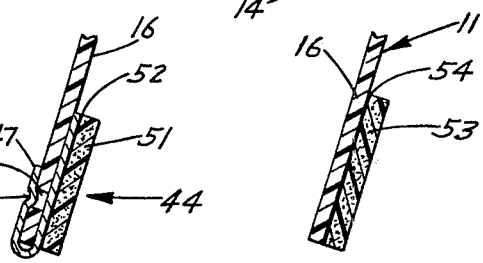
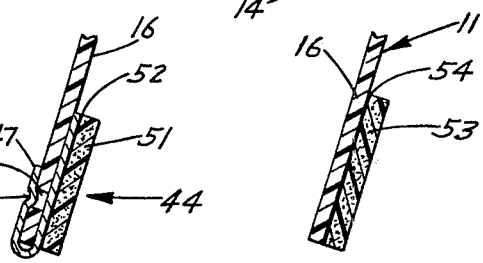

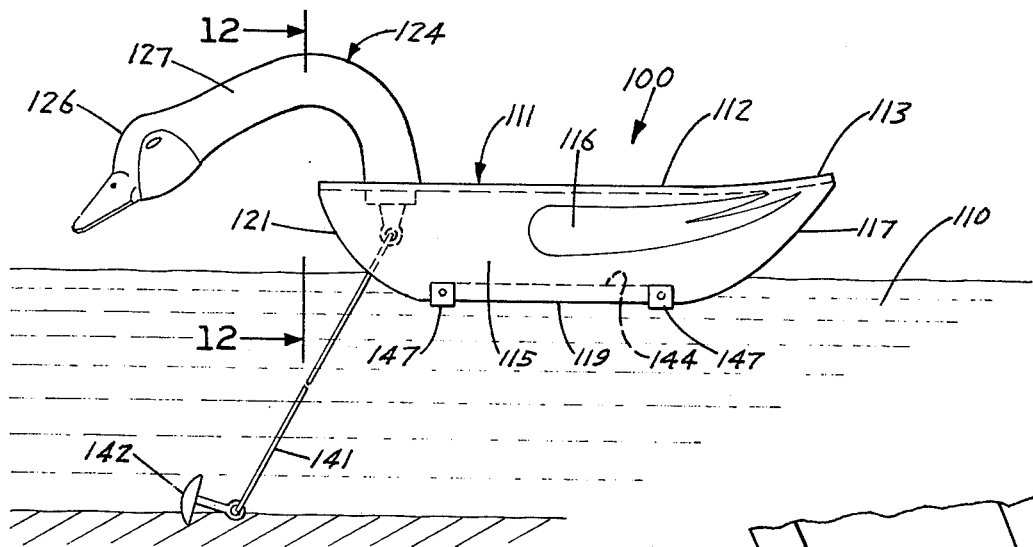
FIG.11
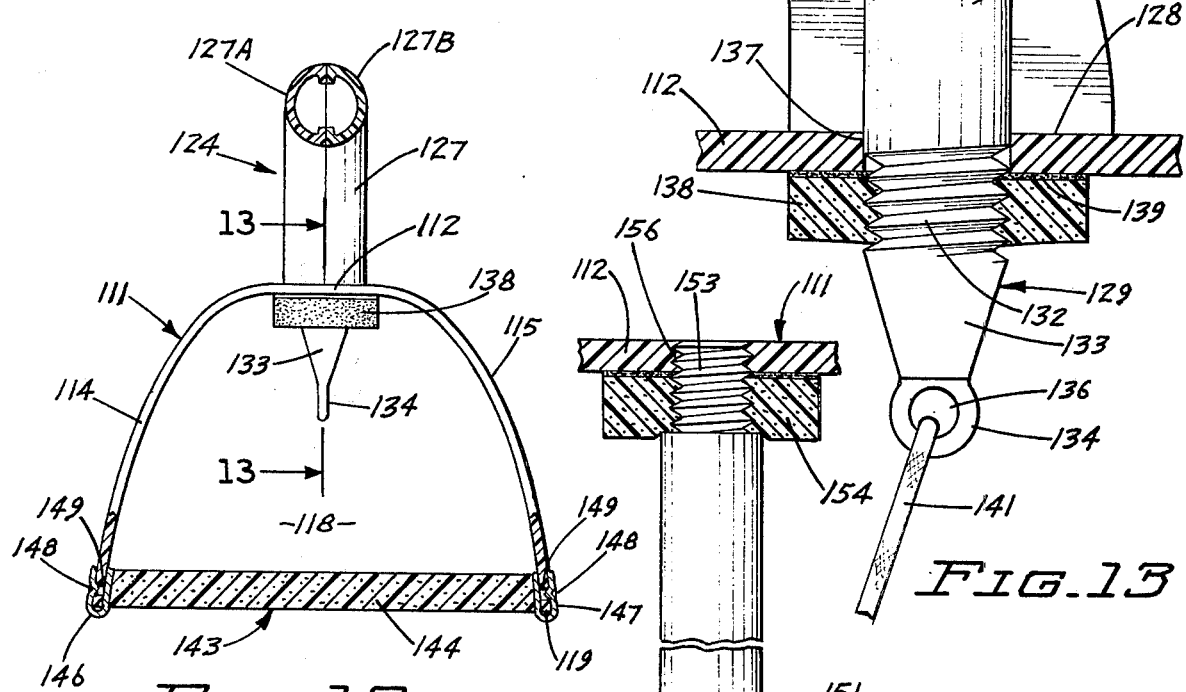
FIG.12
FIG.13
FIG.14
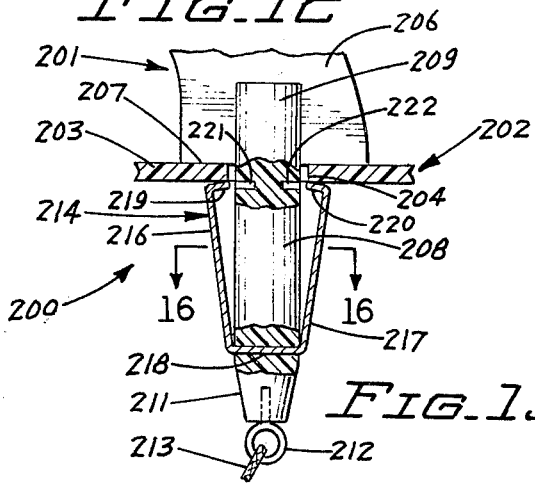
FIG.15
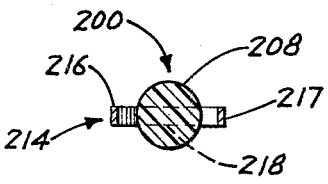
FIG.16

DECOY

CROSS-REFERENCE TO RELATED APPLICATION:

This application is a continuation-in-part of U.S. application Ser. No. 414,918, filed Nov. 12, 1973 now abandoned.

BACKGROUND OF INVENTION:

1. Field of the Invention

The present invention relates to a decoy to attract wild game. More particularly, the invention is directed to a fowl decoy, as a duck or goose, used by sportsmen to attract the attention of wild fowl and entice them to alight on land or water.

2. Prior Art

Fowl decoys are conventionally one-piece head and body construction of wood, plastic or paper simulating the design and color of fowl, as wild ducks and geese. Attempts have been made to make a decoy in several parts to facilitate storage and transportation of the decoy. Strater et al. in 1874 in U.S. Pat. No. 156,239 and Hurd in 1923 in U.S. Pat. No. 1,447,474 show decoys having shell bodies carrying heads which can be separated from the bodies. Supporting decoy bodies on an upright leg is disclosed in U.S. Pat. No. 957,750 and U.S. Pat. No. 1,062,713.

SUMMARY OF INVENTION

The invention is a decoy that simulates the shape and action of a fowl, as a wild duck, goose or the like. The decoy has a body simulating the body of the fowl. The body is shaped in a generally inverted U-shaped member which has open front and rear ends. The body acts as a vane or rudder in the wind so that the decoy will turn or face the wind in accordance with the natural instinct of wild fowl. Head means simulating the head of a fowl is releasably connected to the body. Coacting means on the body and head means releasably connect the head means to the body. The coacting means is a tongue and groove structural arrangement which can take the form of a keyhole slot in the body and a projection on the head means. The projection has a groove engaging the edge of the body forming the keyhole slot. In another form, the coacting means has a threaded projection cooperating with a flexible foam washer to securely hold the head means on the body. The coacting means can be a pair of movable legs which abut against the body to hold the head assembly on the body. The decoy is usable in a field with an upright leg. The upright leg has a groove accommodating the edges of the body forming an opening to releasably attach the leg to the body. Flotation members attached to the body insure that the body will float on water.

An object of the invention is to provide a decoy with a body that can be manufactured at a low cost, easily set up and taken apart and nested for storage and transportation. A further object of the invention is to provide a decoy with a body construction which is responsive to the movement of the wind so that the decoy will face into or align itself with the wind in accordance with the natural instincts of wild fowl. Another object of the invention is to provide a decoy that can be used in the field or on water and has interchangeable parts. Yet another object of the invention is to provide a decoy with a body and head assembly that has coacting releasable structure that firmly holds the head in a fixed position on the body. A further object of the invention is to provide a decoy with structure which connects the head and body that has means for anchoring the decoy when used on a body of water.

IN THE DRAWINGS

FIG. 1 is a side elevational view of a fowl decoy of the invention;

FIG. 2 is a top plan view of the fowl decoy of FIG. 1;

FIG. 3 is a bottom plan view of the fowl decoy of FIG. 1;

FIG. 4 is a front elevational view of the fowl decoy of FIG. 1;

FIG. 5 is a rear relevational view of the fowl decoy of FIG. 1;

FIG. 6 is an enlarged sectional view taken along the line 6—6 of FIG. 3;

FIG. 7 is an enlarged sectional view taken along the line 7—7 of FIG. 3;

FIG. 8 is a fragmentary view of a fowl decoy equipped with a water flotation assembly;

FIG. 9 is an enlarged sectional view taken along the line 9—9 of FIG. 8;

FIG. 10 is a sectional view similar to FIG. 9 showing a modification of the flotation structure for the fowl decoy of FIG. 1;

FIG. 11 is a side elevational view of a fowl decoy of the invention floating on a body of water;

FIG. 12 is an enlarged sectional view taken along the line 12—12 of FIG. 11;

FIG. 13 is an enlarged sectional view taken along the line 13—13 of FIG. 12;

FIG. 14 is a fragmentary elevational view, partly sectioned, of a support used to hold the decoy in a field position;

FIG. 15 is a modification of the holding structure retaining the head assembly on the decoy body for the fowl decoy of the invention; and FIG. 16 is a sectional view taken along line 16—16 of FIG. 15.

DESCRIPTION OF PREFERRED EMBODIMENTS

Referring to FIGS. 1-5, there is shown a water fowl decoy indicated generally at 10 in the general outline of a duck. The decoy 10 can also have the shape of other fowl, as geese or other birds. Decoy 10 has a one-piece body indicated generally at 11 having a generally inverted U-shape. Body 11 is a one-piece member formed from construction material as wood, compressed paper, plastic, rubber, sheet metal and the like. Body 11 has a central longitudinal back 12 terminating in a slightly upwardly directed tail 13. Integral with the back 12 are downwardly and outwardly curved sides 14 and 16. As shown in FIGS. 2 and 3, sides 14 and 16 have upwardly and inwardly tapered rear edges 17 and 18. The rear of the body 11 has an opening 19 permitting air to flow through the body between the sides 14 and 16.

The sides 14 and 16 have upwardly curved front edges 21 and 22 forming the breast outline of the decoy. The space between the curved front edges 21 and 22 provides a front opening 23 whereby moving air can flow through the decoy. The sides 14 and 16, having linear shapes, provide vanes for aligning the decoy with the moving air. This assures that the decoy will be positioned into the wind.

A head assembly indicated generally at 24 is releasably attached to the forward portion of the back 12.

Head assembly 24 has a fowl-shaped head 26 carrying a forwardly extended bill 27. Integral with the head is a downwardly directed neck 28. The head, bill and neck are formed from an expanded foam material, as polystyrene. Other materials, as wood, metal, paper and plastic, can be used to form the head, bill and neck. The neck has a generally flat bottom surface 29 located in tight surface engagement with back 12 so that the angular position of the head on the body can be changed and remains in the changed position. This holding action of the surface 29 on body 11 is achieved in all positions of the head assembly 24. In other words, the head assembly 24 can be turned 360° relative to the body without releasing the head assembly 24 from the body and the head assembly 24 will remain in its changed position as the surface 29 is in tight frictional engagement with the top of body 11.

As shown in FIG. 7, a downwardly directed member or projection indicated generally at 31 is secured to the neck 28. Projection 31 has a part 32 embedded in a bore or recess in the bottom of neck 28 to firmly attach the projection 31 to the neck 28. The projection 31 extends through a keyhole opening 33 in the back 12. The keyhole opening 33 has an enlarged circular portion open to an elongated linear portion which is defined with a continuous edge 36. The projection 31 has a groove 34 having a width to accommodate the thickness of the back 12. The groove 34 has a depth sufficient to permit the projection 31 to move into the slot portion of the keyhole opening. The edge portions located in the groove 34 connect the projection to the back 12.

The head assembly 24 can be rotated about a generally upright axis to thereby angularly position the head with respect to the body. As shown in FIGS. 1-5, the head is longitudinally aligned with the longitudinal axis of the body. The head assembly 24 can be rotated about a generally upright axis so that the bill 27 is at an angle with respect to the longitudinal axis of the body. The head assembly 224 can be provided with an elongated and downwardly curved neck known as a "feeder neck." Bill 27 would be directed toward the supporting surface, or water, to simulate a feeding waterfowl.

The body 11 is supported above the surface of the ground with a generally upright support or leg 37. The lower end 38 of the leg has a point to facilitate penetration into the ground. The upper end 39 of leg 37 extends through a keyhole opening 41 in the central portion of the back 12. They keyhole opening 41 has a circular portion and a forwardly directed slot. The back has a continuous edge 42 forming the keyhole opening. The upper end 39 of the leg has a groove 43 to accommodate the side edges 42 of the slot. The end 39 of the leg can prevent rotation of the body. The slot 43 can be continuous or circular whereby the body can rotate about the upright axis of the leg 37.

Referring to FIGS. 8 and 9, a flotation assembly indicated generally at 44 is attached to the lower edge of side 16. It is understood that side 14 has a similar flotation assembly whereby the body can float in water. Flotation assembly 44 comprises a pair of generally U-shaped clips 46 and 47 that are positioned over the lower portions of side 16. Each clip has a slight indentation 48 which provides an inwardly directed projection or nipple that fits into a hole 49 in side 16. As shown in FIGS. 2 and 3, side walls 14 and 16 each have two holes 49 for accommodating the clips of the flotation assembly. An elongated strip of buoyant material 51 is secured to the inside portions of the clips 46 and 47 with adhesive 52 or other suitable attaching means. Member 51 extends along the inside of side 16 and has a length substantially equal to the side. The member 51 can be a foamed plastic, such as polystyrene or polyurethane, wood or like floatable materials.

Referring to FIG. 10, there is shown a modification of the flotation assembly for supporting the body on a body of water. The flotation assembly comprises an elongated floating member 53 secured to the inside of side 16. Member 53 can be foamed plastic material attached to side 16 with an adhesive 54. Rivets, bolts or other fastening can also be used to attach member 53 to side 16. Member 53 can extend the full length of sides 14 and 16.

In use, the water fowl decoy is arranged in a field by inserting the leg 37 into the ground. The upper end of the leg is inserted through keyhole opening 41. The back 12 is aligned with groove 43 wherein the leg 37 is moved into the slot portion of the keyhole opening and thereby connects the body of the leg. The head assembly 24 is attached to the body by inserting the projections 31 through the large or round portions of keyhole opening 33. The projection 31 is then linearly moved back into the slot portion of the opening with the groove 34 aligned with the back 12. This positions the bottom surface 29 in firm engagement with the top of back 12 and connects the head assembly 24 to the back 12. The head assembly 24 can be rotated about a generally upright axis of projection 31 to angularly orient the head relative to the body as desired.

When the decoy is used on water, leg 37 is not attached to the body. A flotation assembly 44 is attached to each side 14 and 16. This is accomplished by placing clips 46 and 47 over the bottom portions of the side wall with the identations 48 in alignment with the holes 49. The elongated floatable member 51 is located adjacent the inside of sides 14 and 16 where they do not interfere with the outside appearance of the decoy which may detract the wild waterfowl. The waterfowl decoy can be anchored with an anchor line. The anchor line can have a connector which can fit into the keyhole opening 33 and attach to the back 12. The anchoring of body 11 at its forward portion will permit the body to align itself into the wind to follow the natural position of a waterfowl on water.

Body 11 equipped with a floating material, as shown in FIG. 10, is usable on water without any special attachments. Leg 37 is not attached to the body. The anchor means is used to anchor the decoy in the body. An anchoring means, as described with respect to FIGS. 8 and 9, can be used to anchor the body having the flotation material of FIG. 10.

Referring to FIG. 11, there is shown a water fowl decoy indicated generally at 100, floating on a body of water 110, as a lake, pond, stream or the like. The decoy 100 has the shape of a goose, having a feeder head. Other shapes of fowl, as ducks, birds and other types, can be used.

Decoy 100 has a one-piece shell type body indicated generally at 111. Body 111 has a generally inverted U-shape and can be formed from construction material, as wood, compressed paper, plastic, rubber, sheet metal or the like. Body 111 has an elongated longitudinal back 112 terminating in an upwardly and outwardly directed tail 113. Integral with the back 112 are downwardly and outwardly curved sides 114 and 115. Each side 114 and 115 has a rearwardly directed wing ornamentation 116. Sides 114 and 115 have upwardly curved rear edges 117 providing the back outline of the decoy. The breast of the decoy is formed by upwardly curved convex front edges 121. Edges 117 and 121 form the inlet and outlet openings to the passageway 118 which extends longitudinally through body 111. Passageway 118 is of sufficient size to permit air to flow through the decoy. Sides 114 and 115 have linear, generally flat shapes and provide vanes for aligning the decoy in the direction of movement of the air as the air flows through the passageway 118. This insures that the decoy 100 will be positioned into the wind like a natural waterfowl.

A head assembly indicated generally at 124 is releasably mounted on the forward portion of the back 112 of the body 111. Head assembly 124, as shown in FIG. 11, has a goose head 126 attached to an elongated curved neck 127. As shown in FIG. 12, the neck 127 is a two-piece shell structure 127A and 127B. The shell structures 127A and 127B are secured together with suitable bonding material or adhesive at their adjacent edges to form an elongated hollow neck. The head 126 can also be a shell type structure that is secured together to form head 126. Referring to FIG. 13, head assembly 124 has a generally flat annular surface 128 located in tight surface engagement with the top of back 112. A connector or projection member indicated generally at 129 is operative to releasably mount the head assembly 124 on back 112. The connector 129 has a base 131 that is attached to the end of the neck 127. The end of neck 127 has a large annular surface 128 and end structure for mounting base 131 to the neck 127. This can be accomplished with adhesive material or with suitable fastening means, such as rivets or the like.

Connector 129 has a threaded neck 132 joined to a downwardly converging tapered head 133. A ring 134 is integral with the end of head 133. Ring 134 has an eye 136. As shown in FIG. 11, an elongated flexible member 141, as a cord or line, is attached to ring 134 and to an anchor 142. Connector 129 performs the additional function of providing a means for attaching the anchor to the decoy at the front of the decoy so that the anchoring of the decoy will not interfere with the heading of the decoy into the wind.

As shown in FIG. 13, the threaded neck 132 projects through hole 137 in the back 112. An annular holder or nut member 138 surrounds the neck 132 and cooperates with the threads thereon to securely mount the neck 127 on the back 112. Nut member 138 is a foamed plastic member having a hole aligned with hole 137. The hole in the nut member 138 is smaller than hole 137 whereby the threads of neck 132 firmly engage the nut member. Other materials including rigid materials, as metal, wood and the like, can be used for the nut member 138. An adhesive 139 or other suitable bonding material is used to secure the nut member 138 to the bottom of back 112. Other types of fastening means, as nuts and bolts or rivets, can be used to attach the nut member 138 to back 112. The nut member 138 can be an integral extension of back 112 which is formed into the back during molding of the body 111.

Referring to FIG. 12, body 111 is supported on the surface of the water 110 with a flotation means indicated generally at 143. The flotation means are attached to the forward and rearward sections of the sides 114 and 115 so that body 111 is level on the water 110. The flotation means 143 comprise a transverse foamed plastic member 144 located between sides 114 and 115. Generally inverted U-shaped clips 146 and 147 are attached to opposite ends of member 144. The clips have a width so that they snap onto the lower edges of sides 114 and 115. The outer portion of each clip has an inwardly directed indentation 148 which extends into a hole 149 in the sides 114 and 115. The U-shaped clip structure is shown in detail in FIG. 9. The clips can be readily removed from the body 111 to facilitate stacking a plurality of bodies to minimize storage and transportation space.

Referring to FIG. 14, there is shown an upright support or leg attached to the midportion of body back 112. The stake 151 is used to support the body on the ground when the decoy is in field use. The stake has a pointed lower end 152 and a threaded upper end 153. The stake can be made of metal, wood, plastic, or similar rigid materials. The body has an enlarged portion or nut member 154 having an opening 156. The threaded upper end 153 cooperates with the nut member 154 to attach the stake 151 to the body 111. The nut member 154 can be replaced with an integral hub or boss on the inside of body 111. Other types of connections can be used to attach the support or stake 151 to the midportion of body 111. A keyhole slot structure shown in FIGS. 3 and 6 can be used to attach stake 151 to the body back 112.

Referring to FIGS. 15 and 16, there is shown a modification of the coacting means indicated generally at 200 for mounting a fowl head assembly 201 to aa fowl body 202. Head assembly 201 can have the shape of head assembly 124 or head assembly 24. Body 202 has the stucture of body 111, including a back section 203 having a circular hole 204. Head assembly 201 has a neck section 206 having an annular bottom surface 207 positioned in tight frictional engagement with the top of back section 203. This position is maintained by coacting means 200 in all angular positions of the head asembly 201 on body 202.

Coacting means 200 includes a projection, pin, or connector 208 having a base 209 attached to neck section 206 with adhesive, glue or fasteners, as rivets, bolts and the like. Pin 208 extends through hole 204 and has a cone-shaped or tapered lower end 211 carrying an eye member 212. An anchor line or cord 213 is attached to eye member 212. Cord 213 can be attached to an anchor similar to anchor 142 shown in FIG. 11.

Holding means indicated generally at 214 are mounted on pin 208 and engage the inside of body 202 to hold the head assembly 201 on the body 202. Holding means 214 has a pair of legs or clip members 216 and 217 having a base 218 and inwardly projected feet or flanges 219 and 220. As shown in FIG. 16, legs 216 and 217 are located adjacent opposite sides of pin 208. Base 218 extends through the lower end of pin 208 and can be embedded therein or located within a transverse passage in pin 208. Legs 216 and 217 are flexible spring members. Legs 216 and 217 may be formed from metal and other flexible spring material. The feet 219 and 220 are in engagement with the back section 203 of body 202 so that legs 216 and 217 bias the neck surface 207 in engagement with back section 203.

Pin 208 has recesses or holes 221 and 222 for receiving feet 219 and 220 respectively. Feet 216 and 217 are biased or moved inwardly adjacent pin 208 so that the pin 208 and feet 216 and 217 can be extracted from hole 204. This removes the head assembly 201 from body 202. Head assembly 201 is mounted on body 202 by moving pin 208 through hole 204. Legs 216 and 217 are moved toward pin 208 with feet 219 and 220 extending into recesses 221 and 222. As soon as feet 219 and 220 pass through hole 204, legs 216 and 217 spring outwardly moving feet 219 and 220 into engagement with the inside wall of back section 203. The sides of pin 208 can be provided with vertical grooves to accommodate legs 216 and 217 so that the pin 208 and legs 216 and 217 can be moved through hole 204. A soft rubber or plastic washer can be interposed between the feet 219 and 220 to hold surface 207 in firm engagement with back section 203.

The decoy has been described with respect to preferred embodiments thereof. It is understood that changes and modifications may be made by those skilled in the art without departing from the invention. For example, the body 11 can vary in size and shape to simulate various types of fowl. The body can be made of structural materials, including but not limited to wood, metal, plastic, rubber, paper, cardboard and the like. Head assembly 24 can have various shapes including the feeding shape, nesting shape or sleeping shape. The head assembly can be made of various materials such as foamed plastic, rigid plastic, wood, metal, paper or the like. The coacting releasable connection between the head assembly and body can include a screw and washer to tighten the head to the body. A wire spring can be used to hold the head on the body. Also, the body can have a projection which fits into a hole in the head. The projection 32 can be an integral part of the head and form the projection which fits through the hole in the body. The projection has a groove to accommodate the edge of the body forming the hole. The projection can be two or more spaced parts which can be moved together to enable the projection to fit through a hole in the body. The head assembly and body can be decorated with various color combinations to simulate the colors of wild waterfowl.

The embodiments of the invention in which an exclusive property or privelege is claimed are defined as follows:

1. A decoy comprising: body means simulating the body of a fowl, said body means comprising an inverted generally U-shaped member having a back section, downwardly directed sides joined to the back section, and a longitudinal passage through said member with open forward and rear ends whereby fluids can flow through said body means to orient the body means with the direction of the flow on the fluids, head means simulating the head of a fowl releasably connected to said member, and coacting means on said member and head means to releasably attach the head means to the member, said coacting means including first means on said head means to permit rotation of the head means about an upright axis, and second means on the member accommodating the first means to hold the head means in assembled relation with the member and permit said rotation of the head means, said second means including an opening in the back section, said first means including projection means on said head means extended through said opening, and means cooperating with the projection means and back section to hole the bottom surface of the head means in firm surface engagement with the back section, said means cooperating with the projection means and back section including a plurality of leg members mounted on the projecton means and engageable with the back section, said leg members having inwardly directed feet engageable with the back section, said projection means having recesses to accommodate the feet whereby the projection means and leg members can be inserted through said opening in the back section.

2. The decoy of claim 1 wherein: the plurality of leg members are a pair of yieldable spring members.

3. The decoy of claim 2 wherein: the spring members have a common base extended through the projection means.

4. The decoy of claim 1 wherein: the leg members are yieldable spring members.

5. The decoy of claim 1 including: anchor means to anchor the decoy in a body of water, and cord means connecting the anchor means to the first means of the coacting means.

6. The decoy of claim 1 including: leg means releasably attached to the body means to support the body above a surface, and coacting means on said body means and leg means to releasably attach the leg means to the body means.

7. The decoy of claim 1 including: flotation means attached to the sides to float the decoy on water.

8. The decoy of claim 7 wherein: the flotation means includes clip means releasably connected to said sides.

9. The decoy of claim 7 wherein: the flotation means includes elongated plastic foam members extended along said sides of the body means.

10. A decoy comprising: body means simulating the body of a fowl, said body means having a member having a back section and downwardly directed sides joined to the back section, head means simulating the head of a fowl releasably connected to said member, and coacting means on said member and head means to releasably attach the head means to the member, said coacting means including first means on said head means to permit rotation of the head means about an upright axis, and second means on the member accommodating the first means to hold the head means in assembled relation with the member and permit said rotation of the head means, said second means including an opening in the back section, said first means including projection means on said head means extended through said opening, and means cooperating with the projection means and back section to hold the bottom surface of the head means in firm surface engagement with the back section, said means cooperating with the projection means and back section including a plurality of leg members mounted on the projecton means and engageable with the back section, said leg members having inwardly directed feet engageable with the back section, said projection means having recesses to accommodate the feet whereby the projection means and leg members can be inserted through said opening in the back section.

11. The decoy of claim 10 wherein: the plurality of leg members are a pair of yieldable spring members.

12. The decoy of claim 11 wherein: the members have a common base extended through the projection means.

13. The decoy of claim 10 wherein: the leg members are yieldable spring members.

14. The decoy of claim 10 including: anchor means to anchor the decoy in a body of water, and cord means connecting the anchor means to the first means of the coacting means.

15. The decoy of claim 10 including: flotation means attached to the sides to float the decoy on water.

16. The decoy of claim 15 wherein: the flotation means includes clip means releasably connected to said sides.

17. The decoy of claim 10 wherein: the member of the body means is an inverted generally U-shaped sheet member.

18. The decoy of claim 10 wherein: the member of the body means is an inverted U-shaped member having an open forward end and an open rear end whereby air can flow through said body means.

19. A decoy comprising: a body member simulating the body of a creature, said body member having a back section and downwardly directed sides joined to the back section, head means simulating the head of the creature releasably connected to said member, and coacting means on said member and head means to releasably attach the head means to the member, said coacting means including first means on said head means to permit rotation of the head means about an upright axis, and second means on the member accommodating the first member to hold the head means in assembled relation with the member and permit said rotation of the head means, said second means including an opening in the back section, said first means including projection means on said head means extended through said opening, and means cooperating with the projecton means and back section to hold the bottom surface of the head means in surface engagement with the back section, said means cooperating with the projection means and back section including at least one leg member mounted on the projection means and engageable with the back section, said leg member having an inwardly directed foot engageable with the back section, said projection means having a recess to accommodate the foot whereby the projection means and leg member can be inserted through said opening in the back section.

20. The decoy of claim 19 wherein: the leg member is a yieldable spring member.

21. The decoy of claim 20 wherein: the spring member has a base extended through the projection means.

22. The decoy of claim 19 including; anchor means to anchor the decoy in a body of water, and cord means connected to the anchor means and to the first means of the coacting means.

23. The decoy of claim 19 including: flotation means attached to the sides to float the decoy on water.

24. The decoy of claim 23 wherein: the flotation means includes clip means releasably connected to the sides of the member.

25. The decoy of claim 19 wherein: the body member is an inverted generally U-shaped sheet member.

26. The decoy of claim 19 wherein: the body member is an inverted U-shaped member having an open forward end and an open rear end whereby air can flow through said body member.

* * * * *

UNITED STATES PATENT AND TRADEMARK OFFICE
CERTIFICATE OF CORRECTION

PATENT NO. : 3,939,591
DATED : February 24, 1976
INVENTOR(S) : George H. Schwartztrauber It is certified that error appears in the above-identified patent and that said Letters Patent are hereby corrected as shown below:

On the title page, under the cited references, "3,755,588" should be --2,755,588--.

Column 2, line 20, after "fragmentary", --side-- is omitted.

Column 3, line 40, "224" should be --24--.

Column 4, line 21, "of" should be --to--.

Column 6, line 30, "aa" should be --a--.

Column 7, line 49, "on" should be --of--.

Column 8, lines 48-49, "projecton" should be --projection--.

Column 9, line 27, "projecton" should be --projection--.

Signed and Sealed this twenty-seventh Day of April 1976

[SEAL]

Attest:

RUTH C. MASON
Attesting Officer

C. MARSHALL DANN
Commissioner of Patents and Trademarks